No. 890,096. PATENTED JUNE 9, 1908.
A. REDDING.
IMPLEMENT FOR CHOPPING OR THINNING OUT COTTON.
APPLICATION FILED AUG. 6, 1907.
2 SHEETS—SHEET 1.
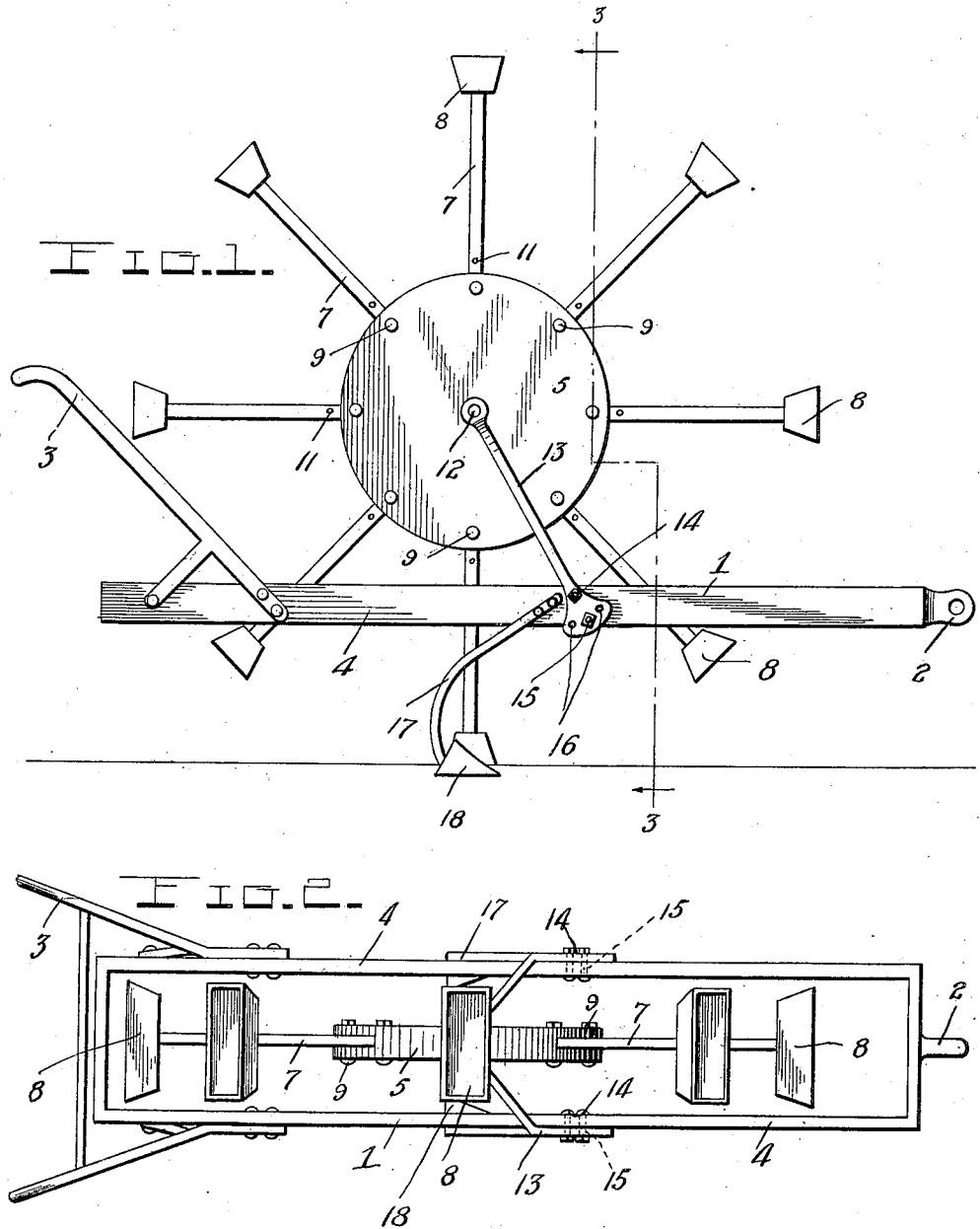
Witnesses
Chas. L. Griesbauer.
D. L. Nach.
Inventor
Anderson Redding
By Watson E. Coleman
Attorney

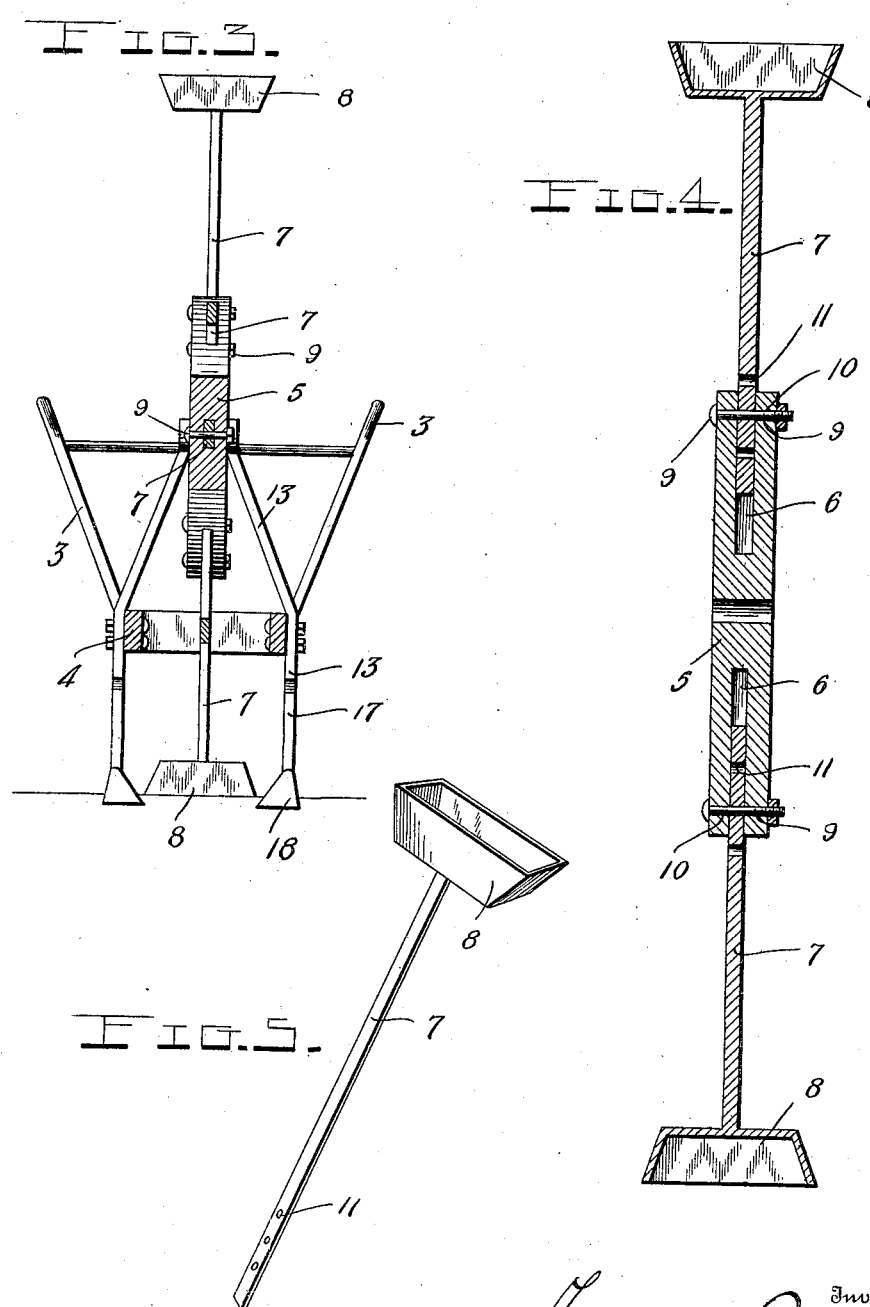

UNITED STATES PATENT OFFICE.

ANDERSON REDDING, OF BOLINGBROKE, GEORGIA.

IMPLEMENT FOR CHOPPING OR THINNING OUT COTTON.

No. 890,096.  Specification of Letters Patent.  Patented June 9, 1908.

Application filed August 6, 1907. Serial No. 387,342.

*To all whom it may concern:*

Be it known that I, ANDERSON REDDING, a citizen of the United States, residing at Bolingbroke, in the county of Monroe and State of Georgia, have invented certain new and useful Improvements in Implements for Chopping or Thinning Out Cotton, of which the following is a specification, reference being had to the accompanying drawings.

My invention relates to improvements in implements for chopping or thinning out cotton and consists of the novel construction and the combination and arrangement of parts hereinafter described and claimed.

The object of the invention is to provide a machine or implement of this character which will be effective in accomplishing its intended purpose and which may be readily adjusted so that the hills of cotton may be formed close to or further from each other.

The above and other objects are attained in the preferred embodiment of the invention illustrated in the accompanying drawings in which Figure 1 is a side elevation of the cotton chopper; Fig. 2 is a top plan view; Fig. 3 is a vertical transverse section taken on the plane indicated by the line 3, 3 in Fig. 1, and Fig. 4 is a detail section through the hub or body portion of the wheel, and Fig. 5 is a perspective of one of the cup carrying members or arms.

My improved cotton chopper comprises a rectangular frame 1 having at its front end a clevis 2 for the attachment of a draft animal or animals and at its rear suitably connected and braced handles 3 which have their lower ends fastened to the parallel side bars 4 of the frame.

Mounted for rotation above and within the frame 1 is a wheel 5 the body portion of which is in the form of a flat circular disk having in its periphery radially extending sockets 6 adapted to slidably receive cup carrying members 7. These members 7, of which any suitable number may be provided, are in the form of straight rods having at their outer ends cup-shaped heads 8 preferably of the form shown in the drawings. The inner ends of the rods 7 are radially adjustable in the hub or body 5 of the wheel owing to their sliding engagement with the sockets 6 and to the provision of transverse bolts or similar fastenings 9 passed through apertures 10 in said body and through apertures 11 in said rods. Two or more of the apertures 11 are provided in each of the rods 7 so that they may be adjusted radially as will be readily understood upon reference to Fig. 4. The wheel 12 is journaled in suitable bearings, formed in the upper ends of upwardly and rearwardly inclined brackets 13 which have their lower ends adjustably connected to the side bars 4 of the frame. These brackets are constructed of resilient metal so that the wheel may yield as it passes over uneven ground. The brackets are adjustably connected to the side bars 4 by means of pivot bolts 14 and adjusting bolts 15. The bolts 15 are adapted to pass through any of the concentric series of apertures 16 formed in the enlarged lower ends of the brackets, as clearly shown in the drawings. By means of this connection it will be seen that the brackets may be inclined at different angles for the purpose of adjusting the wheel vertically.

Depending from the side bars 4 in transverse alinement with the axis of the wheel, are standards or feet 17 carrying at their lower ends plows or shovels 18 of any suitable form and construction.

In operation, the machine or implement is drawn forwardly over a row of cotton plants so that the row is straddled, and the wheel 5 is caused to rotate owing to the engagement of the cups 8 with the ground. Since the cups 8 are centrally disposed they will cover a suitable portion of the row of cotton and protect such portion from being covered with earth by the plows or shovels 18, it being noted that as the wheel revolves the cups will engage the ground in advance of the plows and will remain in engagement with the ground until the plows have passed. By shortening the cup carrying rods or arms 7 the cups 8 will be brought closer together so that the hills of cotton plants will be formed nearer to each other, and by lengthening said arms or rods the cups will be disposed further apart and hence will cause the hills of cotton to be spaced further apart. When the cup carrying arms or rods are adjusted it is necessary to adjust the bearing brackets 13 for the wheel in order that the cups will properly engage the ground.

Having thus described my invention what I claim is:

1. In an implement of the character described, a frame having side bars, bearing brackets carried by said side bars, a disk journaled between said bearing brackets and formed in its periphery with radial sockets, said disk being also formed with transverse apertures intersecting said sockets, arms radially slidable in said sockets and formed with longitudinal series of transverse apertures adapted to aline with those in the disk, fastening bolts passed through the alining apertures to adjustably secure the arms in the disk, cups carried by the outer ends of the arms and adapted to engage the ground, and covering shovels arranged on opposite sides of the frame and having their standards connected to said side bars, substantially as described.

2. In an implement of the character described, a frame having side bars, a pair of bearing brackets formed at their upper ends with bearings and at their lower ends with an enlargement, the latter being formed with a pivot opening and a series of apertures arranged concentric with said pivot opening, pivot bolts passed through said pivot openings and the side bars of the frame to pivotally mount the brackets thereon, adjusting bolts passed through the side bars of the frame and certain of the apertures in the enlargements of the brackets to secure the latter in adjusted angular positions, a wheel mounted for rotation in the bearings at the upper ends of the brackets, radial arms upon the wheel provided at their outer ends with cups to engage the ground, and covering shovels arranged on opposite sides of the frame and having their standards secured to said side bars, substantially as described.

In testimony whereof I hereunto affix my signature in the presence of two witnesses.

ANDERSON REDDING.

Witnesses:
W. A. GRAY,
W. F. COLE.